United States Patent [19]

Higashiyama

[11] 4,402,217
[45] Sep. 6, 1983

[54] ELECTRONIC ENGINE CONTROL SYSTEM WITH CHECKING UNIT FOR SENSORS AND ACTUATORS THEREIN

[75] Inventor: Kazuhiro Higashiyama, Atsugi, Japan

[73] Assignee: Nissan Motor Company, Limited, Kanagawa, Japan

[21] Appl. No.: 249,742

[22] Filed: Mar. 31, 1981

[30] Foreign Application Priority Data

Apr. 7, 1980 [JP] Japan .................................. 55-44589

[51] Int. Cl.³ .......................................... G01M 15/00
[52] U.S. Cl. ................................................. 73/117.3
[58] Field of Search .................. 73/117.3, 116, 119 A; 364/551; 371/24, 25

[56] References Cited

U.S. PATENT DOCUMENTS 4,234,921 11/1980 Kinoshita et al. .............. 364/551 X
4,317,364 3/1982 Asano et al. ....................... 73/117.3
4,325,251 4/1982 Kanegae ....................... 73/117.3 X

FOREIGN PATENT DOCUMENTS

54-9846 1/1979 Japan .................................. 73/117.3

Primary Examiner—Jerry W. Myracle
Attorney, Agent, or Firm—Schwartz, Jeffery, Schwaab, Mack, Blumenthal & Koch

[57] ABSTRACT

An electronic control system for an internal combustion engine in an automotive vehicle can check sensors for determining various engine operating parameters and actuators for controlling the engine operation corresponding to the engine operating condition which is determined by a microcomputer based on the sensor signals. The control system therefore includes a check unit cooperative with the microcomputer for operating the later for effecting the checking operation corresponding to selected one of sensors and actuators.

22 Claims, 6 Drawing Figures

| CHECK ITEM | RESISTOR | SENSOR POSITION ACTUATOR POSITION | | PHOTODIODE CONDITION | | | |
|---|---|---|---|---|---|---|---|
| THROTTLE ANGLE SWITCH | $R_1$ | $V_1$ | ON / OFF | $D_{10}$ | ON / OFF | $D_{11}$ | OFF / ON |
| AIR-CONDITIONER SWITCH | $R_2$ | $V_2$ | ON / OFF | $D_{20}$ | ON / OFF | $D_{21}$ | OFF / ON |
| TRANSMISSION NEUTRAL SWITCH | $R_3$ | $V_3$ | ON / OFF | $D_{30}$ | ON / OFF | $D_{31}$ | OFF / ON |
| STARTER SWITCH | $R_4$ | $V_4$ | ON / OFF | $D_{40}$ | ON / OFF | $D_{41}$ | OFF / ON |
| AIR FLOW METER | $R_5$ | $V_5$ | CLOSED / OPENED | $D_{50}$ | ON / OFF | $D_{51}$ | OFF / ON |
| FUEL INJECTOR | $R_6$ | $V_6$ | INJECTING / FUEL CUT OFF | $D_6$ | ON / OFF | | |
| EGR CONTROL VALVE | $R_7$ | $V_7$ | OPERATING / NOT OPERATING | $D_7$ | ON / OFF | | |
| IDLE AIR CONTROL VALVE | $R_8$ | $V_8$ | OPERATING / NOT OPERATING | $D_8$ | ON / OFF | | |
| BATTERY VOLTAGE SENSOR | $R_9$ | $V_9$ | OK / NG | $D_{90}$ | ON / OFF | $D_{91}$ | OFF / ON |
| CRANK ANGLE SENSOR | $R_{10}$ | $V_{10}$ | OK / NG | $D_{100}$ | ON / OFF | $D_{101}$ | OFF / ON |
| VEHICLE SPEED SENSOR | $R_{11}$ | $V_{11}$ | OK / NG | $D_{110}$ | ON / OFF | $D_{111}$ | OFF / ON |
| ENGINE COOLANT TEMPERATURE SENSOR | $R_{12}$ | $V_{12}$ | OK / NG | $D_{120}$ | ON / OFF | $D_{121}$ | OFF / ON |

ELECTRONIC ENGINE CONTROL SYSTEM WITH CHECKING UNIT FOR SENSORS AND ACTUATORS THEREIN

BACKGROUND OF THE INVENTION

The present invention relates generally to an electronic control system for an internal combustion engine mountable in an automotive vehicle. More particularly, the invention relates to the electronic engine control system provided with a checking unit for checking sensors and actuators in the control system.

Recently, the electronic engine control system for automatically controlling the fuel injection amount and timing, the spark ignition timing, the exhaust gas recirculation rate and the idle engine speed and so on corresponding to the engine operating condition, has been becoming popular. In such control systems, it is quite important to input accurately determined data indicative of the engine operating condition. It is also essential for effective engine control to precisely actuate the actuators of the fuel injector, the exhaust gas recirculation rate control valve, the idle air control valve and so on. On the other hand, if the controlling microcomputer fails, it is quite difficult to seek the case of the failure in conventional systems.

SUMMARY OF THE INVENTION

Therefore, it is an object of the present invention to provide an electric engine control system including a check unit for checking the actuators and sensors which are part of the engine control system.

Another and more specific object of the present invention is to provide an engine control system with a check unit which can selectively check the actuator and/or sensor in the control system and display the results of the checking operation.

A further object of the invention is to provide a check unit for sensors and actuators in the electronic engine control system which can effect a checking operation corresponding to manually selected items and to visually display the results of checking operation.

To accomplish the above-mentioned and other objects of the invention, there is provided a check unit cooperating with a microcomputer in the electronic control system. The check unit is adapted for selecting the sensor or actuator to be checked and operating the microcomputer for effecting a checking operation corresponding to the required checking operation depending upon the nature of the sensor and actuator to be checked.

According to one embodiment of the invention, there is provided an electronic engine control system for an internal combustion engine having an engine assembly including an air intake, a throttle valve, an intake manifold, exhaust system and a combustion chamber. A sensor means is provided for determining engine operating conditions and generating a sensor signal indicative of the determined engine operating conditions. This system also includes a control means processing the sensor signal and generating a control signal corresponding to the engine operating condition represented by the sensor signal, an actuator responsive to said control signal and controlling the ratio of the energized and deenergized period thereof depending on the duty factor of said control signal, and a check unit cooperating with the control means and generating a command signal for operating the control means for effecting the checking operation. The check unit includes a selector means for selecting an item to be checked. The selector means is manually operative for operating the control means to effect the checking operation for the selected item. A display means is incorporated in the check unit and adapted for displaying the result of the checking operation.

Another and principle object of the present invention is to provide a method for checking sensors and actuators incorporated in an electronic engine control system of an automotive vehicle to determine whether they work in their normal state.

A further object of the present invention is to provide a checking method for checking sensor and actuator operation corresponding to an item manually selected. The method includes displaying the result of the checking operation for each item being checked.

For accomplishing the above-mentioned and other objects of the present invention, there is provided a method for checking sensors and actuators in an electronic engine control system. The method includes selecting items representative of one of the sensors or actuators to be checked, operating a microcomputer as a controller in the engine control system to effect the checking operation corresponding to the selected item and displaying the result of checking operation.

According to one embodiment of the present invention, there is provided a method for checking sensors and actuators in an electronic engine control system comprising manually selecting one of the sensors and actuators to be checked and generating a selector signal identifying the selected sensors and actuators, operating the microcomputer for effecting the checking operation corresponding to the select one of the sensors and actuators, producing a checking signal based on the result of the checking operation, and displaying the result of the checking operation corresponding to the checking signal.

BRIEF DESCRIPTION OF THE INVENTION

The present invention will become more fully understood from the detailed description given hereinbelow and from the accompanying drawings of the preferred embodiment of the present invention, which, however, should not be taken as limitative of the invention but for the purpose of elucidation and explanation only.

In the drawings.

DESCRIPTION OF THE PREFERRED EMBODIMENT

Figure 1:
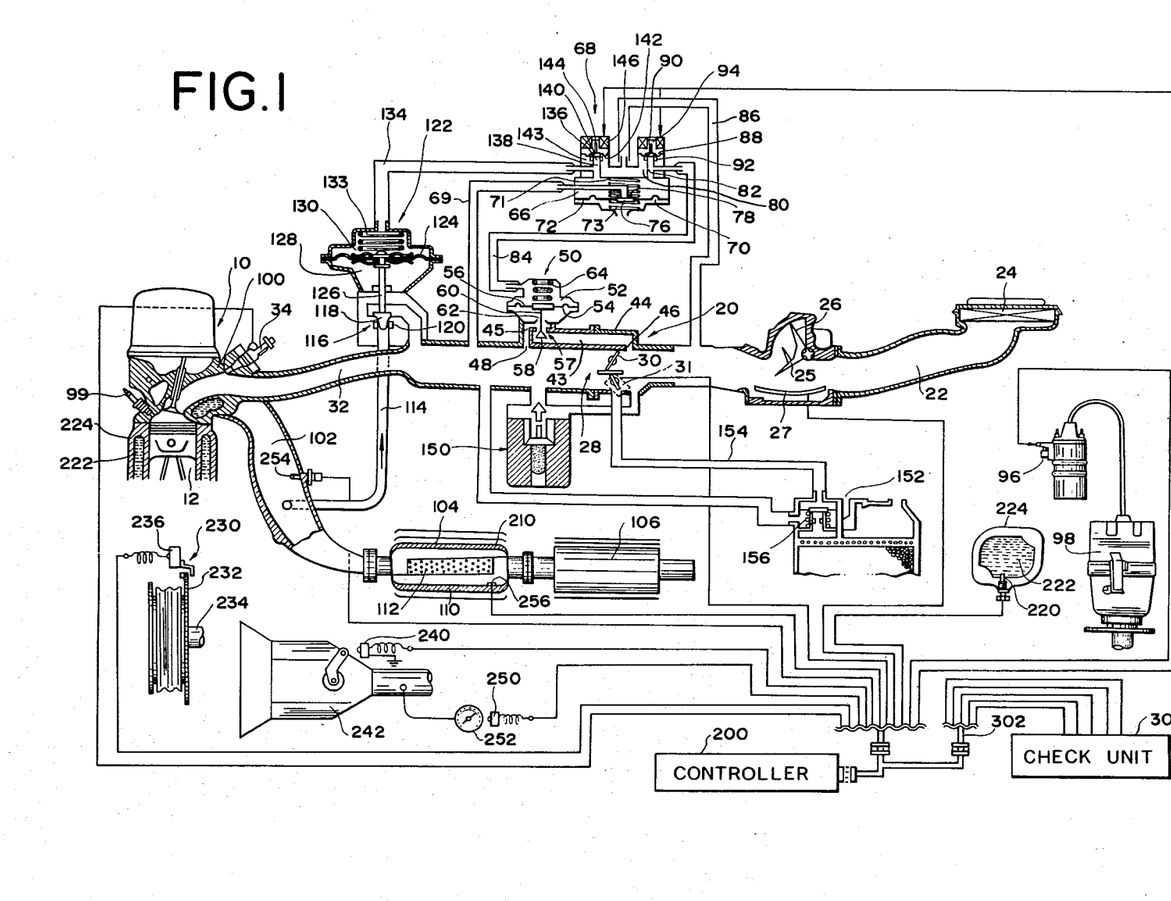
FIG. 1 is a diagrammatic illustration showing the general construction of an internal combustion engine with an electronic engine control system according to the present invention.

Referring now to the drawings, and particularly to FIG. 1, there is illustrated the general construction of an internal combustion engine with an electronic control system for controlling the engine operation corresponding to various parameters. A control system according to the present invention is schematically shown as an example and for the purposes of explanation only, and should not be taken as limitative of the scope of the present invention. It should be appreciated that the system according to the present invention will be applicable to any type of internal combustion engine which can be controlled by a microcomputer mounted on a vehicle.

In FIG. 1, each of the engine cylinders 12 of an internal combustion engine 10 communicates with an air intake passage generally designated by 20. The air intake passage 20 comprises an air intake duct 22 with an air cleaner 24 for cleaning atmospheric air, an air flow meter 26 provided downstream of the air intake duct 22 to measure the amount of intake air flowing therethrough, a throttle chamber 28 in which is disposed a throttle valve 30 cooperatively coupled with an accelerator pedal (not shown) so as to adjust the flow rate of intake air flowing therethrough, and an intake manifold 32 having a plurality of conduits not clearly shown in FIG. 1. The air flow meter 26 comprises a flap member 25 and a rheostat 27. The flap member 25 is rotatably provided in the air intake passage 20 so that it can be rotated about the rotational axis thereof to vary the angle position with respect to air flow corresponding to the amount of air flow. Namely, the flap member 25 is rotated clockwise in FIG. 1 responsive to increasing of the air flow amount. The rheostat 27 opposite the flap member 25, generates an analog signal indicative of the air flow rate. The rheostat 27 is connected with an electric power source and has a variable resistance value corresponding to the variation of the air flow amount. A throttle angle sensor 31 is connected with the throttle valve 30. The throttle angle sensor 31 comprises a full throttle switch which is turned on in response to opening of the throttle valve in excess of a given open angle, and an idle switch which is turned on if the throttle valve open angle is less than a minimum value. The fuel injection amount through the fuel injector 34 is controlled by an electromagnetic actuator (not shown). The actuator is electrically operated by another control system which determines the fuel injection amount, fuel injection timing and so on corresponding to engine operating conditions determined based on engine operation parameters such as an engine load, engine speed and so on. It should be noted that, although the fuel injector 34 is disposed on the intake manifold 32 in the embodiment shown, it is possible to locate it in the combustion chamber 12 in a per se well known manner.

A bypass passage 44 is provided to the intake air passage 20. One end 46 of the bypass passage 44 opens between the air flow meter 26 and the throttle valve 30 and the other end 48 opens downstream of the throttle valve 30, adjacent to the intake manifold 32. Thus the bypass passage 44 bypasses the throttle valve 30 and connects the upstream of the throttle valve 30 to the intake manifold 32. An idle control valve, generally designated by 50, is provided in the bypass passage 44. The idle control valve 50 generally comprises two chambers 52 and 54 separated by a diaphragm 56. The bypass passage 44 is thus separated by the valve means 50 into two portions 43 and 45 respectively located upstream and downstream of the port 57 of the valve 50. The valve means 50 includes a poppet valve 58 disposed within the port 57 in a manner that it is movable between two position, opening the valve to establish communication between the portions 43 and 45 of the passage 44 and the other closing the valve to block communication therebetween. The poppet valve 58 has a stem 60 whose end is secured to the diaphragm 56 so as to cooperatively move therewith. The diaphragm 56 is biased downwards in the drawing, so as to release the poppet valve 58 from a valve seat 62, by a helical compression coil spring 64 disposed within the chamber 52 of the valve means 50. Thereby, the valve 50 is normally opened, and provides normal communication between the portions 43 and 45 of the bypass passage 44. The chamber 54 of the idle control valve 50 is opened to the atmosphere to introduce the atmospheric air thereinto. On the other hand, the chamber 52 of the idle control valve 50 communicates with a pressure regulating valve 68 as the control vacuum source through a vacuum passage 84. The pressure regulating valve 68 is separated into generally two chambers 66 and 70 by a diaphragm 72. The chamber 66 of the pressure regulating valve 68 is also communicated with the downstream side of the throttle valve 30 through the vacuum passage 69 so as to introduce the intake vacuum. The chamber 70 is open to the atmosphere in a per se well known manner. To the diaphragm 72 is secured a valve member 76 which is opposed to a valve seat 78 provided at the end of the passage 69. In the chambers 66 and 70 there are respectively disposed helical compression springs 71 and 73. The springs 71 and 73 are generally of equal spring pressure in a position in which the diaphragm 72 is in the neutral position. It will be noted that the chamber 66 can also be connected with a exhaust-gas recirculation (EGR) control valve which recirculates a part of the exhaust gas flowing through an exhaust passage and exhaust recirculation passage to the intake manifold 32.

The diaphragm 72 is moved upwards or downwards by the change of the balance between the vacuum in the chamber 66 and the atmospheric pressure introduced into the chamber 70. By moving of the diaphragm 72, the valve member 76 is moved toward and away from the valve seat 78.

Another chamber 80 is also defined in the control valve 68, which chamber 80 communicates with the chamber 66 through a passage 82. The passage 82 is connected with the chamber 52 of the idle control valve 50 through the control vacuum passage 84. On the other hand, the chamber 80 is further communicated with the air intake passage 20 upstream of the throttle valve 30 through a passage 86 so as to introduce the atmospheric air. The chamber 80 is partitioned by a diaphragm 88 on which a magnetic valve member 90 is secured. The magnetic valve member 90 opposes a valve seat 92 formed at the end of the passage 82. Also, the magnetic valve member 90 opposes an electromagnetic actuator 94 which is controlled the ratio of the energized period and the deenergized period of a control pulse signal generated by a controlled 100. Depending on the amount of the atmospheric air introduced into the passage 82 from the chamber 80, which amount is determined by the ratio of energized period and deenergized period of the electromagnetic actuator 94, the control vacuum for controlling the opening degree of the valve member 58 of the idle control valve 50 is regulated and fed to the control valve through the control vacuum passage 84.

Spark ignition plugs 99 are inserted into respective engine cylinders 12 to effect ignition at a controlled timing. The ignition plugs 99 are connected with a distributor 98 which receives electric power from an ignition coil 96.

An exhaust system for the engine exhaust gas comprises an exhaust manifold 100, an exhaust passage 102, an exhaust gas purifier 104, a silencer 106 and an exhaust nozzle 108. The exhaust manifold 100 opens toward the engine cylinders to take up the engine exhaust gas. The exhaust passage 102 communicates with the exhaust manifold 100 in series and is provided therein with the exhaust gas purifier 104 and the silencer 106. In the embodiment shown, the exhaust gas purifier 104 comprises a purifier housing 110 and a three-way catalyst 112 disposed within the purifier housing 110. The three-way catalyst 112 oxidizes the monoxide carbon CO and hydrocarbon HC and reduces nitrogen oxide $NO_x$.

An exhaust gas recirculation passage 114, which is referred to hereinafter as EGR passage is connected to the exhaust passage 102 upstream of the exhaust gas purifier 104. The EGR passage 114 communicates with the intake manifold 32 via an exhaust gas recirculation rate control valve 116 which is hereinafter referred as EGR control valve. The EGR control valve 116 generally comprsies a valve member 118 with a valve seat 120 which is provided at the end of the EGR passage 114 adjacent the intake manifold 32. The valve member 118 is incorporated with a vacuum actuator 122 and is cooperatively connected with a diaphragm 124 of the vacuum actuator 122 via a stem 126. The diaphragm 124 divides the interior of the vacuum actuator 122 into two chambers 128 and 130. The chamber 128 communicates with the EGR passage 114, and the chamber 130 communicates with the regulating valve 68 via a control vacuum passage 134 and has disposed therein a set spring 133. The control vacuum passage 134 is joined with a passage 136 connecting the vacuum chamber 66 with a chamber 138. One end of the passage 136 faces a valve member 140 secured on a diaphragm 142. A valve seat 143 is provided on the end of passage 136 to seat the valve member 140 thereon. The valve member 140 has a stem portion 144 inserted within an electromagnetic actuator 146.

The electromagnetic actuator 146 is controlled by the ratio of the energized period and deenergized period thereof for moving the valve member 140 to and fro with respect to the valve seat 143 corresponding to a control signal indicative of the duty factor thereof. The control signal is fed from a controller described later. By the motion of the valve member 140, intake air is admitted to the passage 136 via the passage 86 at a controlled amount. The intake air admitted into the passage 136 is mixed with the intake vacuum admitted from intake passage 20 downstream of the throttle valve 30 via the vacuum induction passage 69 into the vacuum chamber 66, so as to produce the control vacuum. The control vacuum thus produced is fed into the chamber 130 of the actuator 122 via the control vacuum passage 134 to control opening and closing of the EGR control valve 116. Thereby, the exhaust gas is admitted into the intake manifold at a controlled rate.

An air regulator 150 is provided adjacent the throttle chamber 28 for regulating the intake air flowing through the throttle chamber. Also, a carbon canister 152 is provided. The carbon canister retains the vapor until the canister is purged by the air down through the purge line 154 to the intake manifold when the engine is operated. When the engine runs at idle, the purge control valve 156 is closed. Only a small amount of purge air flows into the intake manifold through the constant purge orifice. As the engine speed increased, and the ported vacuum raises higher, the purge control valve opens and the vapor is sucked into the intake manifold through both the fixed orifice and the constant purge orifice. Thus, the carbon canister can reduce the hydrocarbons by the activation of charcoal therein.

Figure 2:
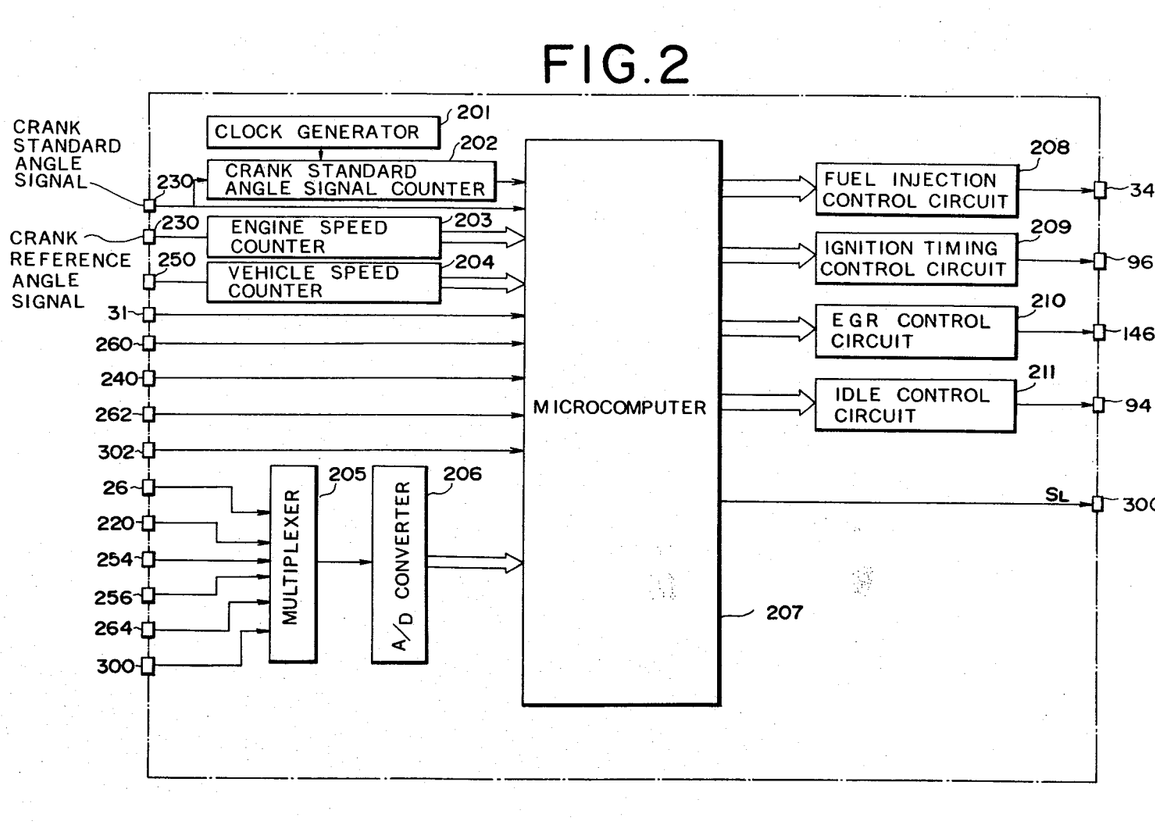
FIG. 2 is a schematic block diagram of a controller in the electronic control system of FIG. 1.

As shown in FIGS. 1 and 2, the controller 200 generally comprises a microcomputer 207 which controls a fuel injection system, a spark ignition system, an EGR system and an idle engine speed. The controller 207 is connected with an engine coolant temperature sensor 220. The engine coolant temperature sensor 220 is generally inserted into a coolant chamber 222 in an engine cylinder block 224 to determine the engine coolant temperature. The engine coolant temperature sensor 220 produces an engine coolant temperature signal $T_w$ indicative of the determined engine coolant temperature. The engine coolant temperature signal $T_w$ is an analog signal having a signal value proportional to the determined engine coolant temperature and is converted into a digital signal to make it applicable for the microcomputer 207 by an analog-digital convertor 206 via a multiplexer 205.

In general construction, the engine coolant temperature sensor 220 comprises a thermistor fitted onto a thermostat housing 226 provided in the coolant circulation circuit.

A crank angle sensor 230 is also connected with the controller 200. The crank angle sensor 230 generally comprises a signal disc 232 secured onto a crankshaft 234 for rotation therewith, and an electromagnetic pick-up 236. The crank angle sensor 230 produces a crank reference angle signal and a crank position angle signal. As is well known, the crank reference angle signal is produced when the engine piston reaches the predetermined position, e.g., 70 degrees before the top dead center and the crank position angle signal is produced per a given crank rotation angle, e.g., per 1 degree of crank rotation.

The crank reference angle signal is inputted to an engine speed counter 203 to determine engine speed. The engine speed counter 203 produces an engine speed signal $N_{RPM}$ corresponding to the frequency of the crank reference angle signal. The crank reference angle signal is directly inputted to the controller 200 and is also inputted to a crank reference angle signal counter 202 which measures the periodic time of the crank reference angle signal. To the crank reference angle signal counter 202 is further inputted a clock signal produced in a clock generator 201.

A transmission neutral switch 240 is connected with the controller 200. The transmission neutral switch 240 is secured to the power transmission 242 to detect the neutral position thereof and produces a neutral signal when the trnasmission neutral position is detected.

Also, a vehicle speed sensor 250 is connected to the controller via a vehicle speed counter 204. The vehicle speed sensor 250 is located adjacent a vehicle speed indicator 252 and produces a pulse signal as a vehicle speed signal having a frequency proportional to the vehicle speed.

In the exhaust gas passage 102, there is provided an exhaust gas temperature sensor 256 in the exhaust gas purifier housing 210. The exhaust gas temperature sensor 256 determines the exhaust gas temperature and produces an analog signal as an exhaust gas temperature signal, which has an analog signal value proportional to the determined exhaust gas temperature. The exhaust gas temperature signal is fed to the controller 200 via the multiplexer 205 and the analog-digital converter 206 in which the exhaust gas temperature signal is converted into the digital signal for application to the microcomputer 207. The output digital signal of the analog-digital converter 206 is representative of the exhaust gas temperature. On the other hand, an exhaust gas sensor 254 such as oxygen sensor hereinafter simply referred as $O_2$ sensor 254 is provided in the exhaust passage 102 upstream of the opening end of the EGR passage 114. The $O_2$ sensor 254 determines the concentration of oxygen in the exhaust gas. The output of the $O_2$ sensor becomes high when the oxygen concentration in the exhaust gas is less than that of the stoichiometric value and becomes low when the oxygen concentration is more than that of the stoichiometric value. The output of the $O_2$ sensor is inputted to the microcomputer 207 via the multiplexer 205 and the analog-digital converter 206 as a λ-signal.

Further, the air flow meter 26 is connected with the controller 200. The rheostat 27 of the air flow meter 26 outputs an analog signal having a signal value proportional to the determined intake air flow rate. The throttle angle sensor 31 is also connected with the microcomputer 207 to feed the outputs of the full throttle switch and the idle switch.

As shown in block form in FIGS. 1 and 2, the microcomputer 207 is further connected with an air-conditioner switch 260, a starter switch 262 and a battery voltage sensor 264. The air-conditioner switch 260 turns on when the air-conditioner is in operation. Also, the starter switch 262 is turned on when the starter is operating. The battery voltage sensor 264 determines the vehicle battery voltage and produces an analog signal having a signal value proportional to the determined battery voltage. The battery voltage signal is fed to the microcomputer 207 via the multiplexer 205 and the analog-digital converter 26.

In the embodiment shown, the controller 200 controls the fuel injection amount and timing, the spark ignition timing, EGR rate and engine idling speed.

For controlling the fuel injection amount in the engine stable condition, which condition is distinguished by the engine speed determined by the engine speed counter 203, the throttle valve angle position detected by the throttle angle sensor 31, the vehicle speed determined by the vehicle speed counter 204 and the $O_2$ sensor signal fed from the $O_2$ sensor 254 is used. In the engine stable condition, the fuel injection amount is feedback controlled based on the $O_2$ sensor signal so that the air/fuel ratio can be controlled to a stoichiometric value. This type of control is called λ-control. If the engine is driven in unstabilized condition, the fuel injection amount is determined generally based on the engine speed and the intake air flow rate which can be replaced by intake vacuum flowing the downstream side of the throttle valve. In the engine unstable condition, the basic fuel injection amount is determined based on the engine speed, and the air flow rate is corrected corresponding to other parameters such as air-conditioner switch position, the transmission gear position, the engine coolant temperature and so on.

The spark ignition timing is generally controlled based on the engine speed, the air flow rate, the engine coolant temperature and so on. Based on the engine speed, the air flow rate, the engine coolant temperature and so on which are indicative of the engine operating condition, advance and retard of the spark advance is determined.

The ERG control is based on the engine speed, the engine coolant temperature, the ignition switch position and the battery voltage. Based on the engine speed and a basic fuel injection amount determined corresponding to the engine speed and the engine load, the recirculation rate of the exhaust gas is determined. The EGR control valve is thus controlled by the ratio of energized period and deenergized period of the actuator thereof corresponding to the determined recirculation rate.

The idle engine speed is controlled basically corresponding to the engine coolant temperature and engine load condition. In the substantially cold engine condition, the engine speed is controlled to be at a predetermined value which is determined corresponding to the engine coolant temperature for effecting fast idle operation. In the normal temperature range, the engine speed is feedback controlled based on the difference between the actual engine speed and a reference engine speed determined based on the engine temperature, engine load condition and other parameters.

As shown in FIG. 1, the controller 200 is connected with a checking unit 300 for checking the sensor operations via a connecting adaptor harness 302'. The detail of the preferred embodiment of the checking unit 300 will be described hereafter with reference to FIGS. 3 to 5.

Prior to describing the details of the checking unit 300, it should be appreciated that the checking unit 300 can be a part of the controller 200 or can be releasably connected therewith only when it is desired to check the sensors.

Figure 3:
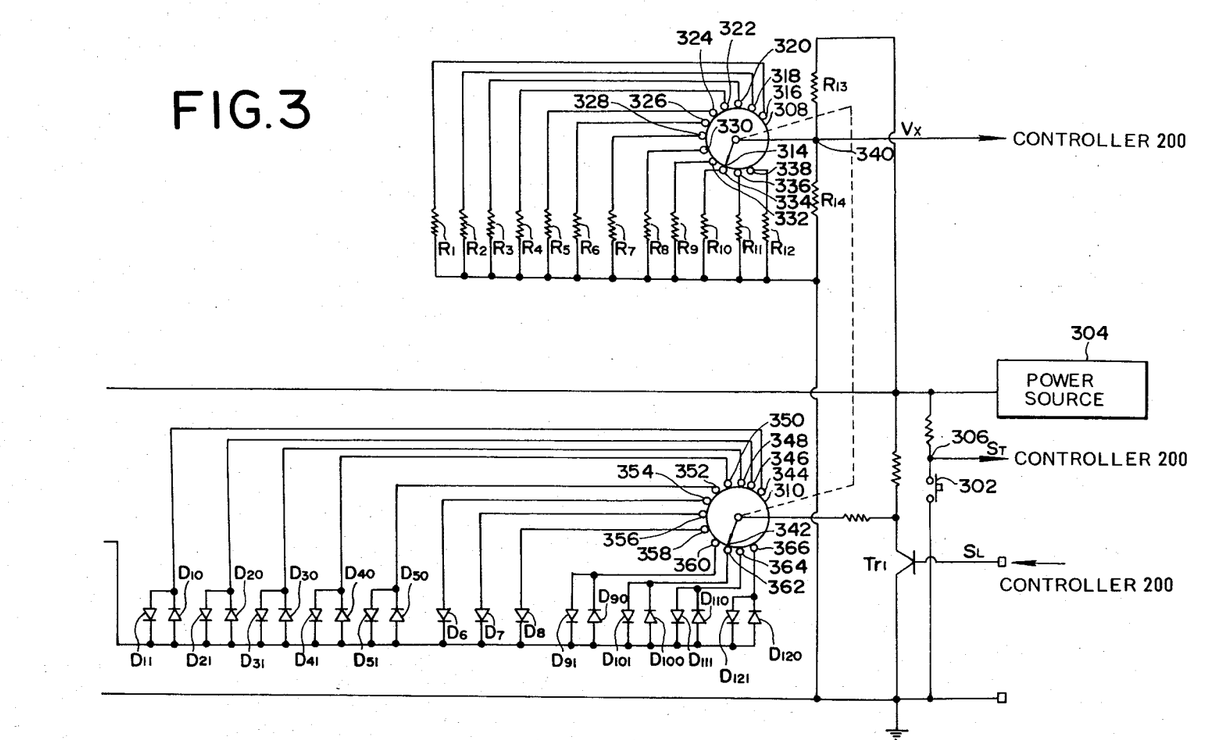
FIG. 3 is a circuit diagram of a preferred embodiment of a check unit according to the present invention, which check unit is shown in the block form in FIG. 1.

Now, referring to FIG. 3, there is illustrated a circuit diagram of the preferred embodiment of the checking unit. In the checking unit 300, a push button switch 302 is connected with an electric power source 304 supplying a constant voltage of electric power. The switch 302 establishes a grounding circuit upon closure thereof to turn the potential at a point 306 from a high level to a low level. The point 306 is connected with the controller 200. The potential at the point 306 is thus applied to the controller 200 as a check start signal $S_T$. The controller 200 is responsive to the check start signal $S_T$ to enter the check mode.

Rotary switches 308 and 310 are cooperatively connected so that the rotary switch 310 can be operated by the operation of the rotary switch 308. The rotary switch 308 is equipped on a front panel 312 of the checking unit 300 for manual operation. The rotary switch 308 has a movable contact 314 on the circumference thereof. The movable contact 314 faces a plurality of stationary contact 316 to 338 which respectively represent the items to be checked. The stationary contacts 316 to 338 are respectively connected with resistance $R_1$ to $R_{12}$ which have respectively varied resistance values. Therefore, current from the source 304 is provided through the movable contact 314, selected one of the stationary contacts 316 to 338 and one of resistors $R_1$ to $R_{12}$ connected to the selected stationary contacts. The power thus flowing through the selected resistor is divided at a point 340 by resistors $R_{13}$ and $R_{14}$. Through the point 340, a signal having the specific voltage corresponding to the selected movable contact is applied to the controller 200 as an item selector signal $V_x$.

Figure 4:
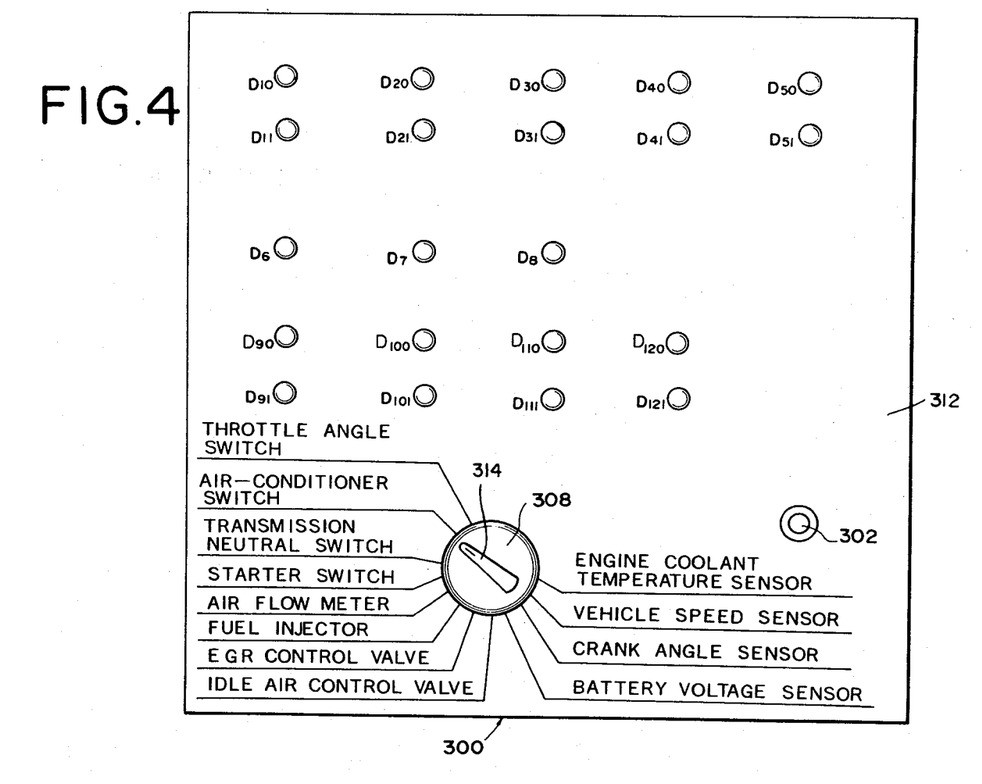
FIG. 4 is a front elevation of a preferred embodiment of a check unit.

For example, assuming the movable contact 314 contacts with the stationary contact 316 corresponding to checking of the throttle angle sensor 31, the resistor $R_1$ is selected for checking the throttle angle sensor 31. Thus, the potential at the point 340 can be specified by the resistors $R_1$, $R_{13}$ and $R_{14}$ to correspond to the specific value $V_1$. The rotary switch 308 corresponds to the items to be checked in order, as shown in FIG. 4. By rotating of the rotary switch 308 and selecting the corresponding item, the specific voltage $V_x$ ($V_2$, $V_3$, $V_4$... $V_{12}$) is applied to the controller 200 via the point 340.

The rotary switch 310 is operable in response to the operation of the rotary switch 308. The rotary switch 310 has a contact 342 and a plurality of stationary contacts 344 to 366. Each of the stationary contacts 344 to 366 is connected to LED (light emitting diodes) $D_{10}$ and $D_{121}$. The LEDs $D_{10}$ to $D_{51}$ and $D_{91}$ to $D_{121}$ respectively connected with terminals 344 to 352 and terminals 360 to 366 consist of each pair having respectively alternative polarity. Namely, the LEDs $D_{10}$ and $D_{11}$ are connected with the stationary contact 344 and alternatively turned on to emit light.

To the rotary switch 310, a check lamp on/off signal $S_L$ from the controller 200 is inputted via a transistor $T_r$ which is turned on and off depending upon the signal level of the check lamp on/off signal. If the movable contact 342 is connected with either one of the stationary contacts 344 to 352 and 360 to 366, either one of LEDs corresponding to the selected stationary contact is turned on and the other is turned off. On the other hand, the LEDs $D_6$, $D_7$ and $D_8$ are respectively responsive to turning off of the transistor $T_r$ to emit light.

As shown in FIG. 4, the LEDs $D_{10}$ to $D_{121}$ are arranged on the front panel 312 of the unit 300. Each pair of photodiodes $D_{10}$ to $D_{51}$ and $D_{90}$ to $D_{121}$ indicate the condition of the sensor corresponding thereto by turning either one of the pairs on. Meanwhile, the LEDs $D_6$, $D_7$ and $D_8$ are turned on when the fuel injector 34, the EGR control valve actuator 146 and the idle air control valve actuator 94 is operated for testing.

It should be noted that the power source 304 can be provided either in the checking unit 300 or the controller 200.

Figure 5:
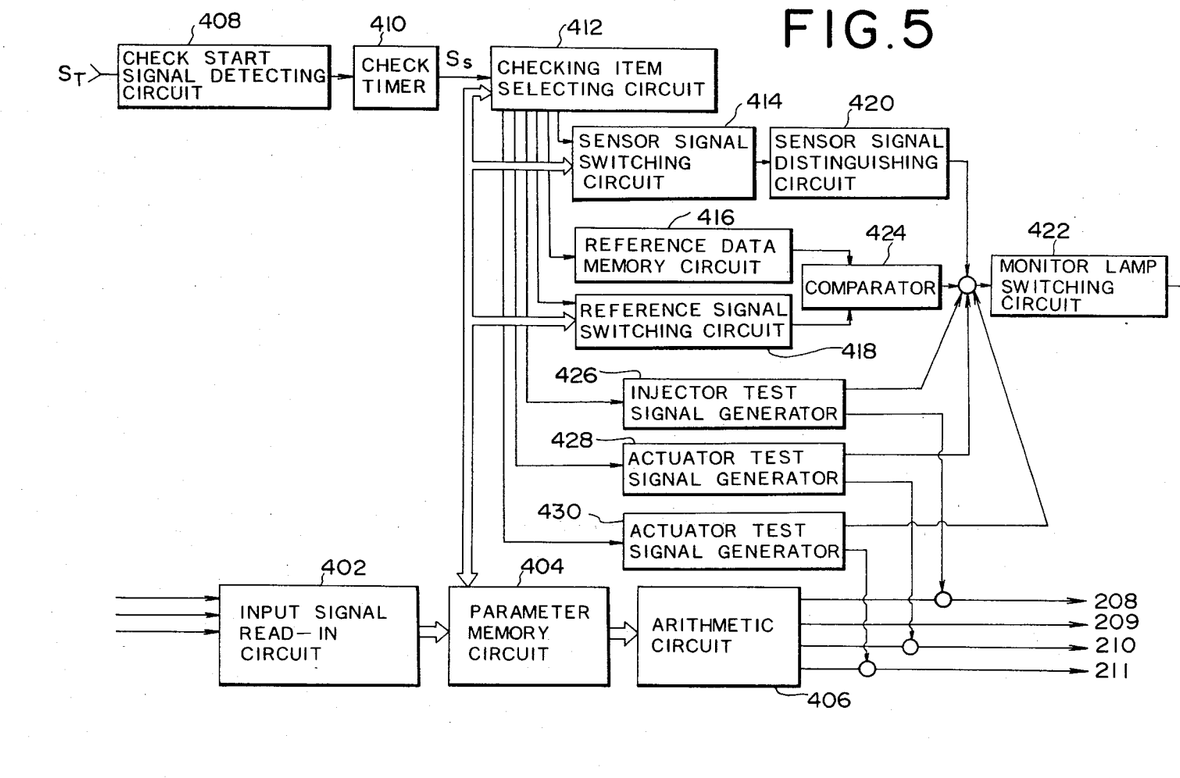
FIG. 5 is an operational block diagram of the controller of FIG. 2, in which is illustrated operational blocks effecting the checking operation.
Figure 6:
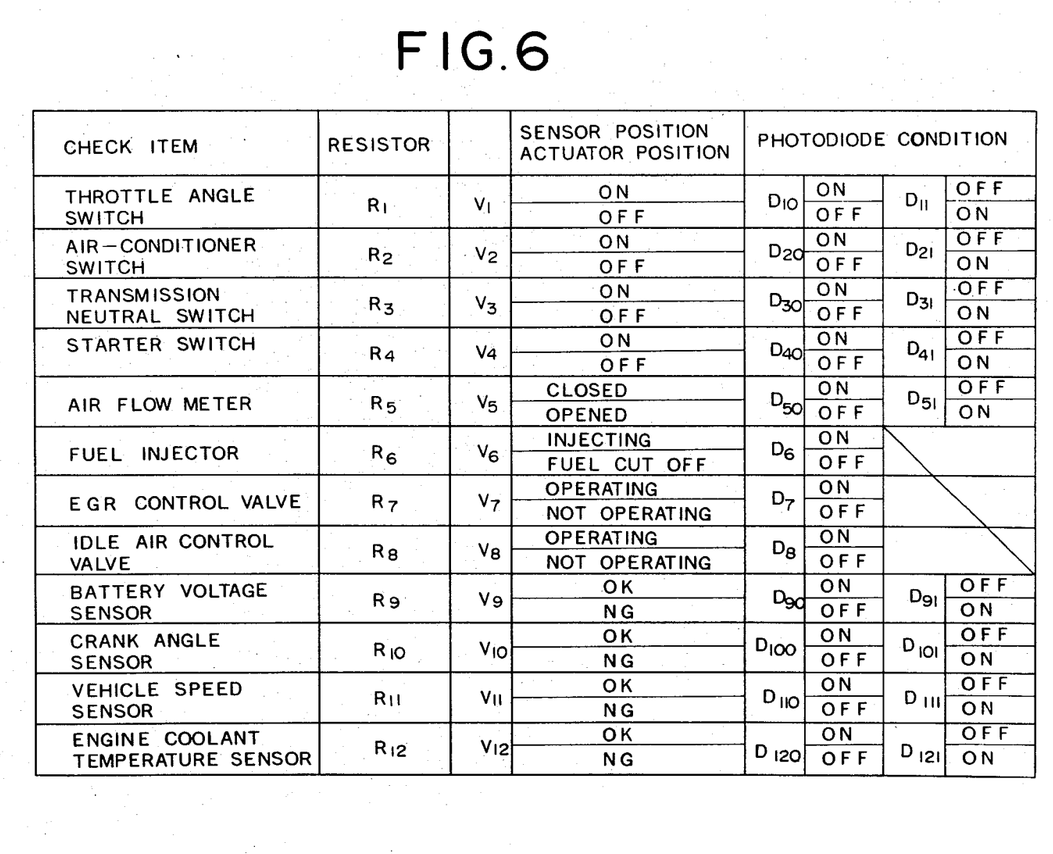
FIG. 6 shows a chart giving the relationship between the state of the sensors/actuators and the display on the check unit of FIG. 4.

Now, referring to FIG. 5, there is illustrated a structure of the microcomputer 207 in a form of functional block. Hereinafter will be described in detail the checking operation together with the structure of the microcomputer mainly with reference to FIG. 5. When the switch 302 is maintained in an off position, the inputs respectively representative of the engine operation parameters are inputted to the microcomputer 207 and are read in an input signal read-in circuit 402. The input signal read-in circuit 402 outputs respectively representative of the read-in inputs thereto in digital form are stored in a parameter memory circuit 404. An arithmetic circuit 406 arithmetically operates to determine the air/fuel ratio of the air/fuel mixture, the spark ignition timing, the EGR rate and the engine idling speed based on the corresponding parameters stored in the parameter memory circuit 404. An output indicative of the determined air/fuel ratio is fed to a fuel injection control circuit 208 (FIG. 2) which generates a fuel injection control signal having a duty factor indicative of the ratio of energized period and deenergized period of the fuel injector 34. An output representative of the determined spark ignition timing is fed to an ignition timing control circuit 209 which generates a spark ignition pulse defining spark ignition timing to be fed to the ignition coil 96. An output representative of the determined EGR rate is fed to an EGR control circuit 210 which generates EGR control signal having a duty factor indicative of the ratio of the energized period and deenergized period of the actuator 146 of the pressure regulating valve 68. An output representative of the determined engine idling speed is fed to an idle control circuit 211 which generates an idle engine speed control signal having a duty factor indicative of the ratio of energized and deenergized period of the actuator 94 of the pressure regulating valve 68.

In response to turning on of the push button switch 302, the check start signal $S_T$ is inputted to a check start signal detecting circuit 408. The check start signal detecting circuit 408 becomes operative to turn on a check timer 410. The check timer 410 outputs an operation command $S_s$ for effecting a checking operation for a checking item selecting circuit 412. The operation command $S_s$ has a predetermined period, e.g., 10 sec., of duration. Within the duration of the operation command $S_s$, the checking item selecting circuit operates to select the item to be checked.

The item selector signal $V_x$ generated by the checking unit 300 is inputted to the input signal read-in circuit 402 and then to the parameter memory circuit 404 to be stored therein. The checking item selecting circuit 412 reads out from the parameter memory circuit 404 the storage corresponding to the selector signal $V_x$ to switch the item to be checked corresponding thereto. The checking item selecting circuit 412 selectively operates a sensor signal switching circuit 414 or a reference data memory circuit 416 and a reference signal switching circuit 418. Namely, when the item selector signal $V_x$ is $V_1$, $V_2$, $V_3$ or $V_4$ and thus the selected item to check is the throttle angle sensor 31, the air-conditioner switch 260, the transmission neutral switch 240 or the starter switch 262, the sensor signal switching circuit 414 is turned on to read-out the storage location corresponding to the item to be checked from the parameter memory circuit 404. The read-out storage in the parameter memory circuit 404 is fed to a sensor signal distinguishing circuit 420. Corresponding to the input indicative of an on or off condition of the sensor to be checked, the sensor signal distinguishing circuit 420 generates a signal having a potential corresponding to the on or off conditions of the sensor, to be fed to a monitor lamp switching circuit 422. In the preferred embodiment, the sensor signal distinguishing circuit 420 generates the high level signal when the sensor is in on position and the low level signal when the sensor is in off position. Responsive to the signal from the sensor signal distinguishing circuit 420, the monitor lamp switching circuit 422 generates the check lamp on/off signal $S_L$ to be fed to the checking unit 300. As in the foregoing, the transistor $T_r$ in the checking unit 300 is responsive to the check lamp on/off signal $S_L$ to turn on the LEDs $D_{10}$, $D_{20}$, $D_{30}$ and $D_{40}$ when the sensor position is on and to turn on the LEDs $D_{11}$, $D_{21}$, $D_{31}$ or $D_{41}$ when the sensor position is off.

For effecting checking for the throttle angle sensor 31, the air-conditioner switch 260, the transmission neutral switch 240, and the starter switch 262, the sensor can be checked by comparing the sensor actual position and the monitored sensor position.

When the selected item to be checked is the air flow meter 26, the battery voltage sensor 264, the crank angle sensor 230, the vehicle speed sensor 250 or the engine coolant temperature sensor 220, the reference data memory circuit 146 and the reference signal switching circuit 418 turn on to begin operation. The reference data memory circuit 416 is preset with various reference data to be read-out corresponding to the item to be checked. The reference signal switching circuit 418 reads-out storage locations from the parameter memory circuit 404 representing the item selector signal $V_x$ (any one of $V_5$, $T_9$, $V_{10}$, $V_{11}$ or $V_{12}$). In response to the signal from the checking item selecting circuit 412, the reference data memory circuit 416 read-out the storage thereof corresponding to the selected item to be checked. The reference data memory circuit 416 outputs the output representative of read-out data to a comparator 424. At the same time, the reference signal switching circuit 418 outputs the output indicative of the read-out data from the parameter memory circuit 404 to the comparator 424. The comparator 424 compares both outputs fed from the reference data memory circuit 416 and the reference signal switching circuit 418 and generates high or low level signals based on the results of the comparation. The signal produced by the comparator 420 is fed to the monitor lamp switching circuit 422 to produce the checking lamp on/off signal $S_L$.

When the rotary switch 308 operates to check the air flow meter 26, the checking unit 300 produces the checking item selector signal $V_5$ and, at the same time, the reference data memory circuit 416 read-in the sensor signal representative of the intake air flow rate. Here, the flap member 25 of the air flow meter 26 is moved to the position corresponding to the position permitting the preset amount of air flow therethrough. Thereafter, the flap member 25 is moved across the above-mentioned position to vary the input value to the reference signal switching circuit 418 from the parameter memory circuit 404. The comparator 424 thus generates alternatively the low level signal and the high level signal responsive to varying of air flow rate due to flap member motion. In the embodiment shown, the comparator output becomes high when the air flow rate is more than the preset value and becomes low when the air flow rate is less than the preset value. Therefore, the potential of the checking lamp on/off signal $S_L$ produced by the monitor lamp switching circuit 422 is altered between a high level and a low level to alternate the transistor position between on and off. In this manner, when the checking lamp on/off signal $S_L$ is at a high level, the LED $D_{50}$ emits light and when the checking lamp on/off signal $S_L$ is at a low level, the LED $D_{51}$ is illuminated.

Therefore, when switching of illumination of the LEDs $D_{50}$ and $D_{51}$ is effected in synchronism with the flap member motion, the air flow meter 26 is in a normal condition. If switching of illumination is not present, it indicates abnormal output level of the air flow meter 26. If both of the LEDs $D_{50}$ and $D_{51}$ are not illuminated at all, it indicates damage of the air flow meter 26 or disconnecting of a cable connecting the air flow meter to the controller 200.

In the preferred construction, the air flow meter 26 is provided with a mark at the position where the air flow rate therethrough corresponds to the preset value.

Whe the rotary switch 308 is turned to the stationary contact 332 and thus the selected item to be checked is the battery voltage sensor 264, the storage of the reference data memory circuit 416 is read out, which storage represents the lower limit of the battery voltage to be regarded as a normal condition. The read-out storage is fed to the comparator 424. At the same time, the storage in the parameter memory circuit 404 indicative of the battery voltage is read out via the reference signal switching circuit 418. The comparator 424 compares the inputs and produces the output signal corresponding to the result of comparing operation. The potential of the output signal becomes a high level if the battery voltage is higher than the present value and, otherwise, becomes a low level. Responsive to the comparator output signal, the monitor lamp switching circuit 422 produces the checking lamp on/off signal $S_L$ having either high level or low level. When the checking lamp on/off signal $S_L$ is a high level, the transistor $T_r$ of the checking unit 300 turns on to illuminate the LED $D_{90}$ and, otherwise, turns off to illuminate the LED $D_{91}$.

When the movable contact 314 contacts with the stationary contact 334 and thus the item selector signal $V_{10}$ is inputted to the controller 200, the checking operation for the crank angle sensor 230 is effected. The storage indicative of maximum and minimum engine speed is read-out from the reference data memory circuit 416. At the same time, the arithmetic circuit 406 arithmetically operates the input from the crank angle sensor 230 representative of the engine speed to obtain the product of the engine speed and the duration of the crank reference angle signal. The obtained product is inputted to the comparator 424 via the parameter memory circuit and the reference signal switching circuit 418. The comparator 424 checks whether the obtained product is in a range defined by the maximum and minimum engine speed read-out from the reference data memory circuit 416. Since the product of the engine speed and the duration of the crank reference angle signal is constant if the crank angle sensor 230 operates correctly, the normal condition exists if the product is between the maximum and minimum engine speed. The comparator 424 generates an output signal having a high level potential if the crank angle sensor 230 is operating in a normal state and, otherwise, produces the lower level output signal. In response to the high level output signal, the monitor lamp switching circuit 422 produces the high level output $S_L$ to turn the transistor $T_r$ on and, in turn, illuminate the LED $D_{100}$. On the other hand, if the crank angle sensor 230 is in abnormal state, the checking lamp on/off signal $S_L$ is a low level so that it turns the transistor off to turn on the LED $D_{101}$.

Responsive to item selector signal $V_{11}$, the vehicle speed sensor 250 is checked. As well known to those skilled in the art, the speed sensor 250 is located adjacent the transmission output shaft. Thus, in each transmission gear position, the vehicle speed determined by the vehicle speed sensor is linearly proportioned to the engine speed. Therefore, the coefficient of the proportion obtained by the arithmetic operation in the arithmetic circuit 406 is stored in the parameter memory circuit 404. For obtaining the proportional coefficient, the drive wheels of the vehicle is driven in a no-load condition at a specified gear position to obtain the engine speed and the vehicle speed.

When the item selector signal $V_{11}$ is inputted, the coefficient stored in the parameter memory circuit 404 is read out and inputted to the comparator 424 via the reference signal switching circuit 418. At the same time, the storage indicative of maximum and minimum value stored in the reference data memory circuit 416 is read out and inputted to the comparator 424. If the read-out coefficient is in a range defined by the maximum and minimum preset values, the vehicle speed sensor 230 is operating in a normal state. Based on the result of the comparing operation, the comparator 424 outputs the high level output signal to turn the transistor $T_r$ on with the high level checking lamp on/off signal $S_L$ of the monitor lamp switching circuit 422. Thus, if the vehicle speed sensor 230 is in normal state, the LED $D_{110}$ is turned on and otherwise the LED $D_{111}$ goes on.

It should be appreciated that the vehicle speed sensor 230 can be checked otherwise. For example, the reference data memory circuit 416 stores a predetermined vehicle speed and comparator 424 compares the preset speed and vehicle speed determined by the vehicle speed sensor 230. In this case, either of the LEDs $D_{110}$ or $D_{111}$ is turned on when the determined vehicle speed is higher than the preset speed and the other is illuminated otherwise. By observing the LEDs $D_{110}$ and $D_{111}$ and the speed meter (not shown), the vehicle speed sensor 230 can be check if it is in a normal state.

The engine coolant temperature is controlled by the thermostat at constant value in the normal temperature condition. Therefore, the engine coolant temperature sensor 220 is checked in a cold engine condition. In this condition, the determined engine coolant temperature is read in the parameter memory circuit 404. In response to the item selector signal $V_{12}$, the storage indicative of the engine coolant temperature is fed to the comparator 424 and is compared with the storage of the reference data memory circuit 416, which is indicative of the upper and lower temperature defining the preset temperature range. If the determined engine coolant temperature is in the preset temperature range, the comparator output becomes high, and otherwise becomes low. Responsive to the comparator output, the monitor lamp switching circuit 422 produces either a high or low output to iluminate either of the LEDs $D_{120}$ or $D_{121}$. Namely, when the engine coolant temperature is in the preset temperature range and thus the engine coolant temperature sensor 220 is in a normal state, the LED $D_{120}$ is turned on to illuminate. Otherwise, the LED $D_{121}$ is turned on.

When the fuel injector 34 is checked, the movable contact 314 contacts with the stationary contact 326 to produce the item selector signal $V_6$ to be fed to the comparator 200. Responsive to the item selector signal $V_6$, the checking item selecting circuit 412 operates an injector drive test signal generator 426. The injector drive test signal generator 426 generates a driving signal which is fed to the fuel injector 34 to actuate same. The driving signal had a duty factor to actuate the injector at a given length with a given interval, e.g. 1 m sec. with 1 sec. interval. The monitor lamp switching circuit 422 is responsive to the drive signal to output the high level checking lamp on/off signal $S_L$ to illuminate the $D_6$. By observing the LED and the fuel injector 34, one may check whether the fuel injector 34 is in a normal state.

When the actuator 146 of the control valve 68 for controlling EGR rate is checked, the movable contact 314 contacts with the stationary contact 328 to produce the item selector signal $V_7$ to be fed to the comparator 200. Responsive to the item selector signal $V_7$, the checking item selecting circuit 412 operates an actuator test signal generator 428. The actuator drive test signal generator 428 generates a driving signal which is fed to the actuator 146 to actuate therefor. The driving signal has a duty factor to actuate the actuator 146 at a given length with a given interval, e.g. 1 m sec. with 1 sec. interval. The monitor lamp switching circuit 422 is responsive to the drive signal to output the high level checking lamp on/off signal $S_L$ to illuminate the LED $D_7$. By observing the LED and the actuator 146, one may check whether the actuator 146 is in a normal state.

When the actuator 94 of the control valve 68 for controlling idle air is checked, the movable contact 314 contacts with the stationary contact 330 to produce the item selector $V_8$ to be fed to the comparator 200. Responsive to the item selector signal $V_8$, the checking item selecting circuit 412 operates an actuator drive test signal generator 430. The actuator drive test signal generator 430 generates a driving signal which is fed to the actuator 94 to actuate same. The driving signal has a duty factor to actuate the actuator 94 at a given length with a given interval, e.g. 1 m sec. with 1 sec. interval. The monitor lamp switching circuit 422 is responsive to the drive signal to output the high level checking lamp on/off signal $S_L$ to illuminate the LED $D_8$. By observing the LED and the actuator 94, one may check whether the actuator 94 is in a normal state.

It should be noted that while the specific embodiment has been illustrated in detail with reference to the accompanying drawings for better understanding of the invention, the invention should not be regarded as limitative to the embodiment shown. For example, each pair of diodes $D_{10}$ to $D_{51}$ and $D_{90}$ to $D_{121}$ can be replaced for checking by a single diode. Further, the items to be checked can be varied in any way depending on the necessity therefor.

What is claimed is:

1. An electronic control system for an internal combustion engine comprising:
    an engine assembly including an air intake, a throttle valve, an intake manifold, an exhaust system and a plurality of combustion chambers;
    a sensor means for detecting an engine operating condition and generating a sensor signal indicative of the detected engine operating condition;
    a control means for processing said sensor signal said control means being operable between a control mode and a check mode, said control means operable in said control mode for producing a control signal in response to said sensor signal and operable in said check mode for producing a condition signal representative of the condition of a selected check item identifying one of said sensors or actuators;
    an actuator, being responsive to said control signal, the operation thereof controlled by said control signal fed from said control means in said control mode for controlling the engine operation;
    a check unit cooperating with said control means and generating a command for operating said control means into said check mode for effecting a checking operation, said check unit including a selector means for selecting said item identifying one of said sensors or actuators to be checked, which selector means is manually operable for selecting said item; and
    a display means connected to said check unit and adapted for displaying a condition data of the item to be checked according to said condition signal for indication of the condition of said item.

2. An electronic control system for an internal combustion engine comprising:

an engine assembly having an engine cylinder block with a plurality of combustion chambers, an air intake system for introducing atmospheric air therethrough and including an air metering means and an exhaust system for exhausting an exhaust gas from said combustion chambers, which exhaust system includes an exhaust gas purifying system;

sensor means for determining various engine operation parameters such as an engine speed, an engine temperature, an engine load condition, a transmission gear position, an air-conditioner switch position, a battery voltage and said sensor means generating sensor signals respectively representative of the determined parameter;

a control means for generating control signals for controlling the engine operation based on said sensor signals, said control means being operable between a control mode for generating said control signals and a check mode for carrying out a checking operation for a selected check item, and said control means producing a condition signal representative of a condition of said selected check item;

actuators responsive to and controlled by respectively corresponding control signals corresponding to the determined engine operating condition;

a check unit cooperating with said control means and generating a command signal for operating said control means into said check mode for effecting said checking operation, said check unit including a manually operable selector means for selecting said check item and for generating a selector signal for identifying the selected check item, said selector signal identifying one of said sensor means and actuators to be checked; and a display means incorporated with said check unit and adapted for displaying said condition of said selected check item according to said condition signal.

3. An electronic control system for an internal combustion engine comprising:

an engine assembly having an engine cylinder block with a plurality of combustion chambers, an air intake including an intake air metering means for introducing an intake air at a controlled rate and an exhaust system for exhausting an exhaust gas from said combustion chambers, said exhaust system including an exhaust gas purifyer for purifying the exhaust gas, said engine assembly further including a fuel injection means for injecting a fuel at a controlled amount, a spark ignition system for effecting combustion in the combustion chamber at a given timing, said exhaust system including an exhaust gas recirculation means for recirculating the exhaust gas into the air intake at a controlled rate;

sensor means for determining various engine operation parameters such as an engine speed, an engine temperature, an engine load, a throttle angle position, a starter switch position, a transmission gear position, an air-conditioner switch position, a battery voltage, an exhaust gas temperature, an oxygen concentration in the exhaust gas, said sensor means generating sensor signals respectively indicative of the determined results;

actuators for controlling an air induction rate, a fuel injection amount, and an exhaust gas recirculation rate, said actuators being incorporated with said engine assembly for controlling the engine operation corresponding to determined engine operating conditions determined by said sensor means;

a control means for producing control signals for controlling an air induction rate, a fuel injection amount, a spark ignition timing, and an exhaust gas recirculation rate corresponding to the engine operating condition, said control means being operative between a control mode for producing said control signals and a check mode for checking the sensor means and actuators, in said checking mode, said control means selectively effecting checking operation for a corresponding item of said sensor means and actuators to be checked and producing a condition signal representative of the condition of said selected item;

a check unit cooperating with said control means and generating a command for switching the operational mode of said control means from said control mode to said check mode, said check unit including selector means to select said item of said sensor means and actuators to be checked by manual operation thereof, which selector means generates a selector signal identifying selected items; and a display means for displaying a condition data of said selected item to show the condition of said item in a normal or abnormal condition.

4. An electronic control system for an internal combustion engine comprising:

an engine assembly including an engine cylinder block with a plurality of combustion chambers therein, an air intake system with a intake air metering means, an exhaust system incorporating an exhaust gas recirculation system for introducing exhaust gas into the air intake system, said air intake system including an auxiliary air induction system for introducing intake air in an engine idling condition, said engine assembly including a fuel injection means having therein an actuator for controlling the fuel injection amount, an idle air control means for controlling intake air flowing through said auxiliary air induction system and including an actuator for controlling the idle air, an exhaust gas recirculation rate control means for controlling exhaust gas recirculation rate admitted into said air intake system and including an actuator for controlling an exhaust gas recirculation rate;

sensor means for determining various engine operating parameters such as an engine speed, an engine temperature, an engine load, a throttle valve angle position, a transmission gear position, an air-conditioner switch position, a battery voltage, an exhaust gas temperature, and an oxygen concentration in the exhaust gas, said sensor means generating sensor signals respectively representative of the corresponding engine operation parameters;

a control means for producing control signals for controlling the fuel injection amount, the idle air flow rate, the exhaust gas recirculation rate, and a spark ignition timing based on the engine operating condition, said control means being operable between a control mode for producing said control signals and a check mode for effecting checking operation for a selected item of the sensor means or actuators;

a check unit cooperating with said control means and generating a command signal for switching the operation of the control means from said control mode to said check mode for effecting checking operation for said selected item, said check unit including a selector means for selecting one of said items to be checked and generating a selector signal identifying the selected item to be checked, said selector signal being fed to said control means for operating said control means to effect said checking operation corresponding to the selected item; and a display means incorporated in said check unit and displaying the result of checking operation corresponding to the selected item to be checked.

5. A system as set forth in any one of claims 1 to 4 inclusive, wherein said check unit comprises a selector switch adapted for manual operation to select one of sensor means and actuators as said check item, a selector circuit for producing said selector signal having a variable signal value corresponding to the selected item and a display circuit acting as said displaying means and being responsive to a signal from said control means indicative of the condition of the selected check item.

6. A system as set forth in claim 5, wherein said display means includes a switching means cooperatively connected with said selector switch of said check means and is adapted to be operated by manual operation of said selector switch.

7. A system as set forth in claim 5, wherein said selector circuit includes a plurality of circuits respectively corresponding to one of said sensor means and said actuators to be checked and respectively generating selector signals respectively having specific values identifying the selected items of corresponding sensor means and actuators, and said control means is responsive to said selector signal for checking the corresponding item identified by the selector signal values.

8. A system as set forth in claim 7, wherein said display circuit includes a plurality of photo-emitting members respectively adapted for indication of the condition of the selected item, said photo-emitting members are turned on and off corresponding to the condition of the selected item.

9. An electronic control system for an internal combustion engine including a plurality of sensor means for determining an engine operating condition and generating sensor signals corresponding to the determined engine operating condition, actuator means for controlling the engine operation corresponding to control signals, a control means having a microcomputer processing said sensor signals and determining said control signals corresponding to the sensor signals wherein said control system comprises:

said control means including a checking means for effecting a checking operation to detecting a condition of an item of the control system elements and generating a display signal indicative of the detected condition of said item to be checked;

a check unit manually operative to make said checking means in the control means operative for effecting said checking operation, said check unit including a selector means for selecting one of said sensor means as said item to be checked and generating a selector signal identifying said item to be checked for operating said control means; and a display means incorporated with said check unit, for indication of the condition of said item, said display means including a pair of indicators respectively responsive to said display signal for displaying the condition of said item.

10. An electronic control system for an internal combustion engine in an automotive vehicle, which system includes sensor means for determining an engine operating condition and generating sensor signals based on the determined engine operating condition, actuator means for controlling a fuel injection amount, an intake air flow rate, an engine speed, an exhaust gas recirculation rate and an idle air flow rate, a microcomputer processing said sensor signals for determining the engine operating condition and determining duty factors of control signals corresponding to the determined engine operating condition, said actuator means controlled by the ratio of an energized period and a deenergized period corresponding to the duty factors indicated in respective control signals, wherein the control system comprises:

a checking means incorporated with said microcomputers for effecting a checking operation for one of said sensor means selected to be checked as a check item, said checking means being adapted to effect various checking operations corresponding to the check item;

a check unit cooperating with said checking means in said microcomputer and being operative to generate a checking command to be fed to said checking means for effecting checking operations therein, said check unit including a selector means for selecting one of sensor means to be checked and for operating said checking means in said control means to effect checking operation corresponding to the selected sensor to be checked; and a display means incorporated with said check unit and having a pair of indicators, for displaying the result of the checking operation, said display means responsive to the output of said checking means to display the sensor means condition, and said indicators are co-operative to each other for indicating normal or abnormal conditions of said check item.

11. A system as set forth in claim 9 or 10, wherein said sensor means to be checked is either one of a throttle angle sensor, an air-conditioner switch position sensor, a transmission neutral switch and a starter switch, and said checking means checks the on and off position of said sensors by comparing same with the actual position thereof.

12. A system as set forth in claim 11, wherein each of said indicators is a photoemitting member, and one of said indicators is turned on and the other is turned off when the detected sensor position is on.

13. A system as set forth in claim 9 or 10, wherein said sensor means to be checked is either one of an air flow meter, an engine coolant temperature sensor, an engine speed sensor, an exhaust gas oxygen sensor, an exhaust gas temperature sensor, a battery voltage sensor and a vehicle speed sensor, and said checking means compares said sensor signal values with a reference value at a predetermined engine operating condition.

14. A system as set forth in claim 13, wherein said checking means compares the sensor signal and reference value when the engine operating condition is varied so that the sensor signal crosses the reference value if the sensor means operates in normal condition.

15. An electronic control system for an internal combustion engine in an automotive vehicle, which system includes sensor means for determining an engine operating condition and generating sensor signals based on the determined engine operating condition, actuator means for controlling a fuel injection amount, an intake air flow rate, an engine speed, an exhaust gas recirculation rate and an idle air flow rate, a microcomputer processing said sensor signals for determining duty factors of control signals corresponding to the determined engine operating condition, said actuator means being controlled by the ratio of energized periods and deenergized periods corresponding to the duty factors of the control signals, wherein the control system comprises:
a checking means incorporated with said microcomputer for effecting checking operation for one of said actuator means to be checked as a check item, said checking means being adapted to be turned on while said actuator means is in an energized position,
a drive signal generator incorporated with said checking means and generating a drive signal having a duty factor to drive said actuator at a given period in a given interval;
a check unit cooperating with said checking means and manually operable to operate said checking means for effecting said checking operation, said check unit including a selector means for manually selecting one of said actuator means to be checked; and
a display means incorporated with said check unit and responsive to said drive signal to be turned on to display the actuating position of the actuator, which actuating position is compared with the actual operation of said actuator means.

16. A system as set forth in claim 15, wherein said display means is a photo-emitting member which is turned on while said driving signal is outputted from said driving means.

17. A system as set forth in claim 15, wherein said driving means is responsive to turning on of said check unit by manual operation therefor.

18. In an electronic control system for an internal combustion engine for controlling a fuel injection amount, an intake air flow rate, a spark ignition timing, an engine speed, an exhaust gas recirculation rate and an idle air flow rate corresponding to an engine operating condition, which system includes various sensors for determining the air flow rate, the engine speed, an engine temperature, an exhaust gas oxygen concentration, an exhaust gas temperature, an engine load condition, a throttle angle position, a transmission gear position, an air-conditioner switch position, a battery voltage, actuators for controlling the fuel injection amount, the intake air flow rate, the exhaust gas recirculation rate and the idle air flow rate and a microcomputer processing various sensor signals to determine duty factors of control signals to be fed to the actuators for controlling the ratio of energized periods and deenergized periods of the actuators for effecting engine operation control corresponding to the engine operating condition, a method for checking each of said sensors and actuators comprising the steps of:
manually selecting one of said sensors and actuators to be checked and generating a selector signal identifying the selected sensors and actuators;
operating said microcomputer for effecting said checking operation corresponding to the selected one of said sensors and actuators and producing a checking signal based on the results of the checking operation; and
displaying the results of the checking operation corresponding to the checking signal with a pair of indicators alternatively turned on to indicate the result of checking.

19. In an electronic control system for an internal combustion engine for controlling a fuel injection amount, an intake air flow rate, an engine speed, a spark ignition timing, an exhaust gas recirculation rate and an idle air flow rate corresponding to an engine operating condition, which system includes various sensors for determining the air flow rate, the engine speed, an engine coolant temperature, an exhaust gas temperature, an exhaust gas oxygen concentration, an engine load, a throttle angle position, a transmission neutral position, an air-conditioner switch position, a battery voltage, actuators for controlling the fuel injection amount, the intake air flow rate, the exhaust gas recirculation rate and the idle air flow rate and a microcomputer processing various sensor signals to determine duty factors of the control signals to be fed to said actuators for controlling the ratio of energized periods and deenergized periods of the actuators for effecting engine operation control corresponding to the engine operating condition, a method for checking each of said sensors and actuators comprising the steps of:
switching the operation mode of the microcomputer from a control mode to a checking mode for effecting a checking operation for selected ones of said sensors and said actuators;
selecting one of said sensors and actuators to be checked and producing a selector signal identifying a selected one of said sensors and actuators;
operating said microcomputer for effecting said checking operation corresponding to said selected one of said sensors and actuators and producing a checking signal representative of the result of the checking operation effected by the microcomputer; and
displaying the result of the checking operation corresponding to the checking signal by an on and off condition of a pair of indicators which indicates the result of said checking.

20. In an electronic control system for an internal combustion engine for controlling a fuel injection amount, an intake air flow rate, an engine speed, a spark ignition timing, an exhaust gas recirculation rate and an idle air flow rate corresponding to an engine operating condition, which system includes various sensors for determining the air flow rate, the engine speed, an engine coolant temperature, an exhaust gas oxygen concentration, an exhaust gas temperature, an engine load condition, a throttle angle position, a transmission neutral position, an air-conditioner switch position, a starter switch position and a battery voltage, actuators for controlling the fuel injection amount, the air flow rate, the engine speed, the exhaust gas recirculation rate and the idle air flow rate and a microcomputer processing various sensor signals and determining duty factors of control signals for controlling the ratio of energized periods and deenergized periods of the actuators to control the engine operation corresponding to the engine operating condition, a method for checking each of said sensors for determining the transmission neutral position, the air-conditioner switch position, a throttle angle position, and a starter switch position comprising the steps of:
- operating said microcomputer to switch the operation thereof from the control mode to the check mode;
- selecting one of said sensors to be checked and generating a selector signal which identifies the selected sensor to be checked;
- operating said microcomputer for effecting a checking operation corresponding to the selected sensor, and comparing the sensor position with a sensor signal produced by the selected sensor; and
- displaying the result of checking by the on or off condition of an indicator.

21. In an electronic control system for an internal combustion engine for controlling a fuel injection amount, an intake air flow rate, an engine speed, a spark ignition timing, an exhaust gas recirculation rate and an idle air flow rate corresponding to the engine operation condition, which system includes sensors for determining the air flow rate, the engine speed, an engine coolant temperature, an exhaust gas oxygen concentration, an exhaust gas temperature, a transmission neutral position, a throttle angle position, starter switch position, an air-conditioner switch position and a battery voltage, actuators for controlling the air flow rate, the fuel injection amount, the exhaust gas recirculation rate and the idle air flow rate, and a microcomputer processing the sensor signals to determine duty factors of control signals for controlling the ratio of energized periods and deenergized periods of the actuators for controlling the engine operation corresponding to the engine operating condition,
   a method for checking each of said sensors for determining the air flow rate, the engine speed, the engine coolant temperature, the exhaust gas oxygen concentration, the exhaust gas temperature and the battery voltage comprising the steps of:
   - operating said microcomputer for changing the operation mode thereof from a control mode to a check mode;
   - selecting one of said sensors to be checked by a manual selecting operation and producing a selector signal identifying the selected sensor to be checked;
   - generating a reference signal in response to said selector signal, said reference signal indicating a predetermined value corresponding to the sensor to be checked;
   - comparing the sensor signal value of the selected sensor and the reference signal value at a predetermined engine operating position and varying the engine operating condition so that the sensor signal value is varied across the reference signal value; and
   - displaying the result of checking by the on and off condition of a photo-emitting member which is turned on when the sensor signal value is above the reference signal value.

22. In an electronic control system for an internal combustion engine for controlling a fuel injection amount, an intake air flow rate, a spark ignition timing, an exhaust gas recirculation rate and an idle air flow rate corresponding to the engine operating condition, which system includes sensors for determining the air flow rate, the engine speed, an engine coolant temperature, an exhaust gas oxygen concentration, an exhaust gas temperature, a transmission neutral position, a throttle angle position, starter switch position, an air-conditioner switch position and a battery voltage, actuators for controlling the air flow rate, the fuel injection amount, the exhaust gas recirculation rate and the idle air flow rate and a microcomputer processing the sensor signals to determine duty factors of control signals for controlling the ratio of energized periods and deenergized periods of the actuators for controlling the engine operation corresponding to the engine operating condition,
   a method for checking operation of each of said actuators comprising the steps of:
   - producing a driving signal to be fed to the actuator to be checked, which driving signal is indicative of a predetermined duty factor;
   - turning on a display while the actuator is energized by said driving signal; and
   - comparing the display with the actuator operation.

* * * * *